United States Patent Office 3,554,693
Patented Jan. 12, 1971

3,554,693
SEPARATION OF SCANDIUM FROM RARE EARTH ELEMENTS
Kent A. Orlandini, West Chicago, Ill., and Johann Korkisch, Vienna, Austria, assignors to the United States of America as represented by the United States Atomic Energy Commission
No Drawing. Filed Jan. 7, 1969, Ser. No. 789,619
Int. Cl. C22b 59/00
U.S. Cl. 23—22                                             4 Claims

ABSTRACT OF THE DISCLOSURE

This invention relates to a process for purifying scandium and for separating scandium values from the rare earths and other values by dissolving the values in an aqueous hydrochloric acid solution which is then mixed with a water-miscible organic solvent containing an organic phosphorus compound. The resulting mixture is passed over a cation exchange resin bed where the rare earths and other values are absorbed by the resin and the pure scandium values pass through the bed and are recovered from the effluent.

CONTRACTUAL ORIGIN OF THE INVENTION

The invention described herein was made in the course of, or under, a contract with the United States Atomic Energy Commission.

BACKGROUND OF THE INVENTION

This process relates to a method of separating scandium from the rare earths and other values with which it is commonly found and for the purification of scandium.

Scandium is generally found associated with yttrium and its chemical behavior is similar to that of yttrium and the rare earths because of their common Group III position.

Separation of scandium from yttrium and the lanthanons may be accomplished by ether extraction of an aqueous solution of the mixed thiocyanates or by tributyl phosphate extraction of a hydrochloric acid solution. In both cases, scandium is soluble in the aqueous phase. In neither process, however, is a complete separation of the scandium from the other values possible, and the mixed thiocyanate media is relatively unstable.

We have developed a process using the principle of combined ion-exchange and solvent extraction which permits almost 100% separation of scandium from the rare earths and many other elements with which it is usually associated. By our method, we are able to quantitatively separate scandium from yttrium, lanthanum, alkali metals, alkaline earth metals, and the trivalent transplutonium elements in addition to the rare earths.

It is therefore one object of this invention to develop a process for separating scandium and rare earth values.

It is another object of this invention to develop a process for the quantitative recovery of scandium from the rare earths and other values.

Finally, it is the object of this invention to develop a process for the purification of the rare earths from any scandium values which may be present.

SUMMARY OF THE INVENTION

The process of this invention involves the dissolution of the scandium-containing rare earth values in an aqueous hydrochloric acid solution. The solution containing the dissolved values is mixed with a water-miscible organic solvent which contains an organic phosphorus compound. The resulting mixture is passed over an organic cation exchange resin bed which absorbs the rare earth and other values, while the scandium values are not absorbed by the resin but pass through the bed with the eluent from which the scandium may then be recovered by conventional means. The scandium-free rare earths and other values may then be eluted from the resin bed by methods known to those skilled in the art.

DETAILED DESCRIPTION OF THE PREFERRED EMBODIMENT

The scandium, rare earths and other values to be separated are dissolved in an aqueous solution of hydrochloric acid. The amount of values which can be dissolved are limited only by their solubility in the acid media. Acid concentration is important because it has a marked effect upon the distribution coefficients of the values to be separated. Thus, although an acid concentration of from 4 to 8 M will provide good separation results, a 6 M concentration is preferred because the best distribution coefficients between scandium and the rare earths are attained with this concentration and it is the most convenient to work with. Concentrations of greater than about 8 M decrease the affinities of the rare earths for the organic resin and concentrations of less than 4 M increase the distribution coefficient of scandium to greater than 1. This results in increased scandium elution times and gives poorer separations.

After the values to be separated have been dissolved in the hydrochloric acid solution, the resulting mixture may be evaporated to dryness or near dryness depending upon the quantity of solids which have been dissolved. The mixture is then cooled and added to a water-miscible organic solvent containing an organic phosphorus compound. It is important that the resulting mixture contain 5% of the acid to obtain the best separation results and the resulting solution may require adjustment to achieve this acid concentration.

A number of water-miscible organic solvents will provide good separation results between scandium and the rare earths, as will a number of organic phosphorus compounds. In the table below are comparisons between the different organic solvents and organic phosphorus compounds. These comparisons are the distribution coefficients of scandium and ytterbium on Dowex 50 resin from a solution containing 95% organic solvent, 5% concentrated hydrochloric acid and 0.1 M of the organic phosphorus compound.

It will be noted that ytterbium has been selected as a representative of the whole group of lanthanides, because this element, as well as other members of the very heavy rare earths, is better extracted with these organic phosphorus compounds from hydrochloric acid solutions than are the light rare earths. Therefore determinations of the distribution coefficients are of special importance in connection with the separation of scandium from the rare earths, because all the other rare earths of lower atomic weight will be stronger absorbed on the resin and hence their separation factors in relation to scandium will be even higher than that for scandium-ytterbium.

|                | Organic phosphorus |        |       |         |        |         |
|----------------|------|--------|-------|---------|--------|---------|
|                | TOPO |        | HDEHP |         | TBP    |         |
| Organic solvent | Sc  | Yb     | Sc    | Yb      | Sc     | Yb      |
| Tetrahydrofuran | <1  | 460    | 3.7   | 2,253   | 74     | 4,200   |
| Hexone         | 5.7  | 7,660  | 11    | 8,636   | 305    | 75,000  |
| Acetone        | 8.3  | 3,220  | 13    | 5,374   | 360    | 20,000  |
| Methyl glycol  | 15   | 10,206 | 200   | 100,000 | 8,450  | 450,000 |
| Methanol       | 105  | 17,960 | 1,043 | 83,000  | 17,700 | 100,000 |
| Acetic Acid    | 251  | 11,045 | 265   | 9,080   | 651    | 11,880  |

From the table it is seen that in all cases, except ytterbium in acetic acid, trioctylphosphine oxide (TOPO) is a stronger extractant than bis(2-ethylhexyl)-orthophosphoric acid (HDEHP) which is, in turn, more effective than tri-n-butylphosphate (TBP). Consequently ready separations of these two elements are readily feasible in many of the media. However, the tetrahydrofuran (THF)-TOPO mixture proves to be the most suitable, because the scandium which has a distribution coefficient of <1 is readily eluted from the resin column, while ytterbium with a distribution coefficient of 460 is still strongly retained.

The amount of organic phosphorus compound present in the acid-organic solvent media is dependent upon the quantity of scandium values present. Thus, about 2 moles of TOPO are required for each mole of scandium present in the solution in order to maintain the distribution coefficient for scandium at less than 1. Generally a concentration of 0.1 M was found adequate for most extraction processes. However, should large amounts of scandium values be present, additional TOPO may be necessary for complete elution of the scandium. Too high a concentration of the organic phosphorus compound will decrease the absorption of both the scandium and the rare earths and will result in poor separation.

Once the scandium and rare earth values have been dissolved in the hydrochloric acid solution and the acid added to the organic solvent and phosphorus compound, the resulting mixture is contacted with a strongly acid cation exchange resin which has been pretreated by soaking in the eluent, which is the acid-organic solvent phosphorus compound mixture. The resin was found to work well in a column and the acid-organic solvent mixture containing the values was allowed to flow through the column at a pressure equal to the back pressure of the column. The rare earths and other values are retained by the resin and the scandium values remain in solution in the eluent mixture. It may be necessary to pass additional eluent through the column to wash the resin completely of scandium values which may remain thereon.

All strongly acid cation exchange resins are suitable for the process of this invention. A resin commercially available under the name of Dowex–50W which is cross-linked to 8% was used for the investigations for the process of this invention. Dowex–50W is made according to Example I of U.S. Pat. No. 2,366,007 granted to D'Alelio on Dec. 26, 1944. The particle size of the resin may vary widely, but particles between 100 and 200 mesh were used with especially good results. The resin used was in the hydrogen form.

The extraction and separation process of this invention was found to work very well at room temperature or at about 25° C.

The scandium values may be recovered from the eluent by methods known to those skilled in the art. For example, the eluent may be dried and the residue containing the scandium values dissolved in benzene or toluene. The scandium values can then be stripped from the organic solvent with dilute hydrochloric acid or nitric acid.

The rare earths and other values present on the cation exchange resin may be easily recovered by washing the excess TOPO from the resin bed with a small quantity of methanol or THF and eluting the pure rare earth values with nitric or hydrochloric acid.

The process of this invention permits absolutely complete separation of scandium from the rare earths. Other elements which are strongly retained by the resin from the eluent solution and thus can be separated from scandium include the oxides and metals of yttrium, lanthanum, alkali metals, magnesium, alkaline earth metals, aluminum, chromium (III), nickel and the trivalent transplutonium elements.

The following example is given as illustrating the process of the present invention and is not to be taken as limiting the scope or extent of the invention.

EXAMPLE

A mixture cotaining 100 mg. of scandium and 20 mg. of ytterbium, europium and cerium was dissolved in 0.5 ml. of 6 M hydrochloric acid. The acid containing the values was then mixed with 9.5 ml. of tetrahydrofuran containing 386 mg. of trioctylphosphine oxide. After cooling to room temperature, this solution was passed through a resin bed which had been pretreated by soaking for 5 minutes in a few milliliters of the eluent solution. The solution was passed through at a flow rate equal to the back pressure of the resin column (~0.5 ml./min.). An additional 150 ml. of eluent was then passed through the column to completely wash any scandium values from the resin. It was determined radiometrically that the scandium purity was 99+% with a yield of 100%. The resin bed was washed with 20 ml. of THF to remove any TOPO present and 20 ml. of 6 N hydrochloric acid was passed over the bed to remove the rare earths. 100% of the rare earths present were recovered and their purity was 99+%.

It will be undestood that the invention is not to be limited to the details given herein but that it may be modified within the scope of the appended claims.

The embodiments of the invention in which an exclusive property or privilege is claimed are defined as follows:

1. A process for separating scandium and rarer earth values comprising: dissolving said values in an aqueous solution containing 4 to 8 M hydrochloric acid; mixing said acid solution containing said dissolved values with a water-miscible organic solvent selected from the group consisting of tetrahydrofuran, hexone, acetone, methyl glycol, methanol and acetic acid containing an organic phosphorus compound; adjusting said mixture to contain 5% hydrochloric acid; contacting said mixture with a cation exchange resin which has been pretreated by soaking with a water-miscible organic solvent containing an organic phosphorus compound, whereby said rare earth values are absorbed by said resin and said scandium values remain in said mixture; collecting said mixture; and recovering said scandium values.

2. The process of claim 1 wherein said water-miscible organic solvent is tetrahydrofuran.

3. The process of claim 2 wherein said organic phosphorus compound is a member of the group consisting of trioctylphosphine oxide, bis(2 - ethylhexyl) - orthophosphoric acid and tri-n-butylphosphate.

4. The process of claim 1 wherein said organic solvent contains 0.1 M trioctylphosphine oxide and said aqueous hydrochloric acid concentration is 6 M.

References Cited

UNITED STATES PATENTS

| | | | |
|---|---|---|---|
| 3,013,859 | 12/1961 | Kuhlman et al. | 23—22 |
| 3,146,063 | 8/1964 | Moore et al. | 23—19X |
| 3,482,932 | 12/1969 | Gump | 23—22 |
| 2,824,783 | 2/1958 | Peppard et al. | 23—15X |

OTHER REFERENCES

Pietrzyk et al.: "Analytical Chemistry," vol. 37, November 1965, pp. 1568–1580.

HERBERT T. CARTER, Primary Examiner

U.S. Cl. X.R.

23—23, 87, 102, 338, 341